(12) United States Patent
Hu et al.

(10) Patent No.: US 9,033,554 B1
(45) Date of Patent: May 19, 2015

(54) LIGHT SOURCE MODULE

(71) Applicant: HON HAI PRECISION INDUSTRY CO., LTD., New Taipei (TW)

(72) Inventors: Chau-Jin Hu, New Taipei (TW);
Feng-Yuen Dai, New Taipei (TW);
Yung-Lun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/083,378

(22) Filed: Nov. 18, 2013

(30) Foreign Application Priority Data

Oct. 29, 2013 (TW) .............................. 102139179 A

(51) Int. Cl.
*F21V 3/02* (2006.01)
*F21V 5/04* (2006.01)
*F21K 99/00* (2010.01)

(52) U.S. Cl.
CPC ...................................... *F21K 9/50* (2013.01)

(58) Field of Classification Search
USPC ............ 362/311.01, 311.02, 311.06, 311.09, 362/311.1, 268
See application file for complete search history.

(56) References Cited

U.S. PATENT DOCUMENTS

| 7,686,478 | B1 * | 3/2010 | Hulse et al. | .................... 362/255 |
| 2003/0095409 | A1 * | 5/2003 | Cheng | ............................ 362/253 |
| 2014/0293614 | A1 * | 10/2014 | Wang He | ................. 362/311.02 |

* cited by examiner

*Primary Examiner* — Thomas M Sember
(74) *Attorney, Agent, or Firm* — Novak Druce Connolly Bove + Quigg LLP

(57) ABSTRACT

The present disclosure relates to a light source module. The light source module includes a light source and a lens facing the light source. The lens includes a bottom surface, a light input surface, a light output surface and a transparent ball. The light input surface is a curved surface depressing from a center of the bottom surface. The light source faces the light input surface. The light output surface is opposite to the bottom surface. The light output surface includes a concave surface located at a center thereof and a convex surface located at peripheral thereof and surrounding the concave surface. The transparent ball is received in a cavity defined by the light input surface. The transparent ball defines a plurality of hollow holes therein.

10 Claims, 4 Drawing Sheets

LIGHT SOURCE MODULE

BACKGROUND

1. Technical Field

The disclosure relates to light source modules, and particularly to a light source module with even distribution of light emission.

2. Discussion of Related Art

Light emitting diodes' (LEDs) many advantages, such as high luminosity, low operational voltage, low power consumption, compatibility with integrated circuits, easy driving, long term reliability, and environmental friendliness have promoted their wide use as a lighting source.

However, the conventional LED illumination apparatus generally has a radiation angle about 120 degrees and generates a butterfly-type light field. The intensity of light emitted by the LED illumination apparatus dramatically decreases when the radiation angle exceeds 120 degrees.

Therefore, what is needed is a light source module which can overcome the described limitations.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the present light source module for microminiaturization. Moreover, in the drawing, like reference numerals designate corresponding parts throughout the whole view.

DETAILED DESCRIPTION OF EMBODIMENTS

Figure 1:
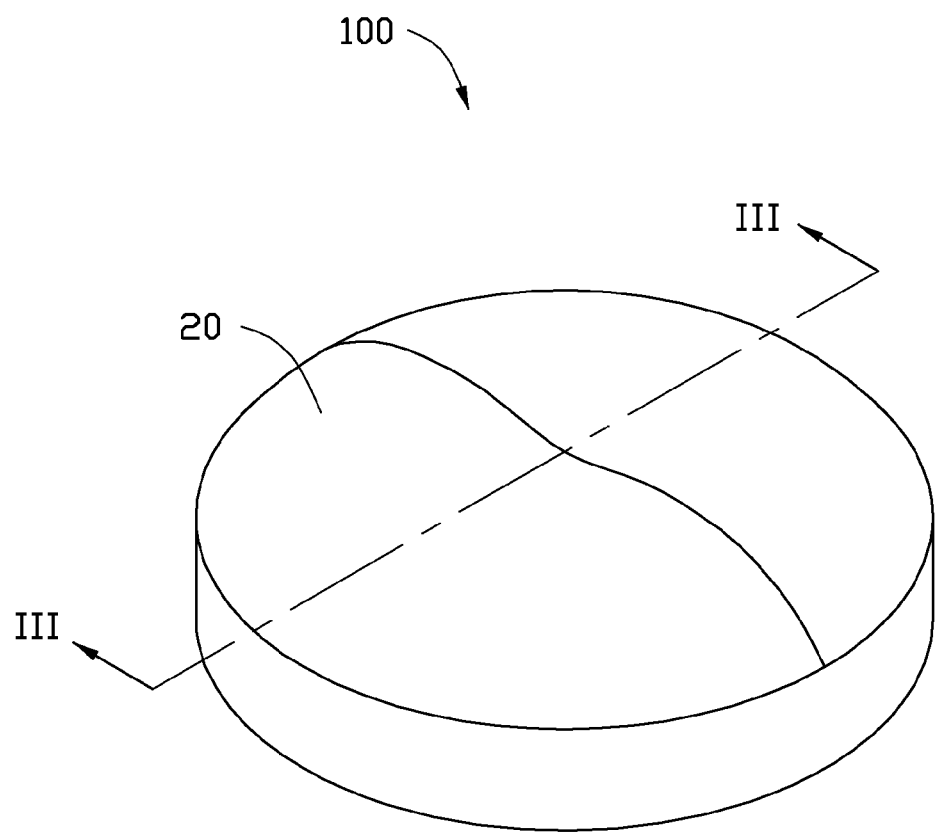
FIG. 1 is a schematic, isometric view of a light source module according to an exemplary embodiment of the present disclosure.
Figure 2:
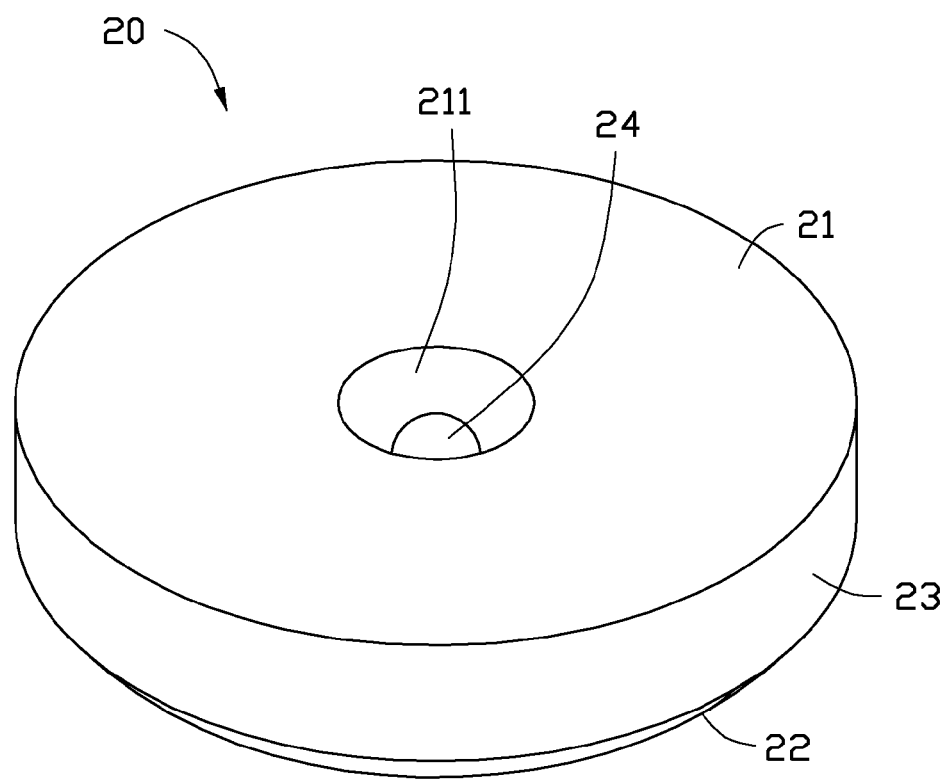
FIG. 2 is an inverted, disassembled view of the lens of the light source module of FIG. 1.
Figure 3:
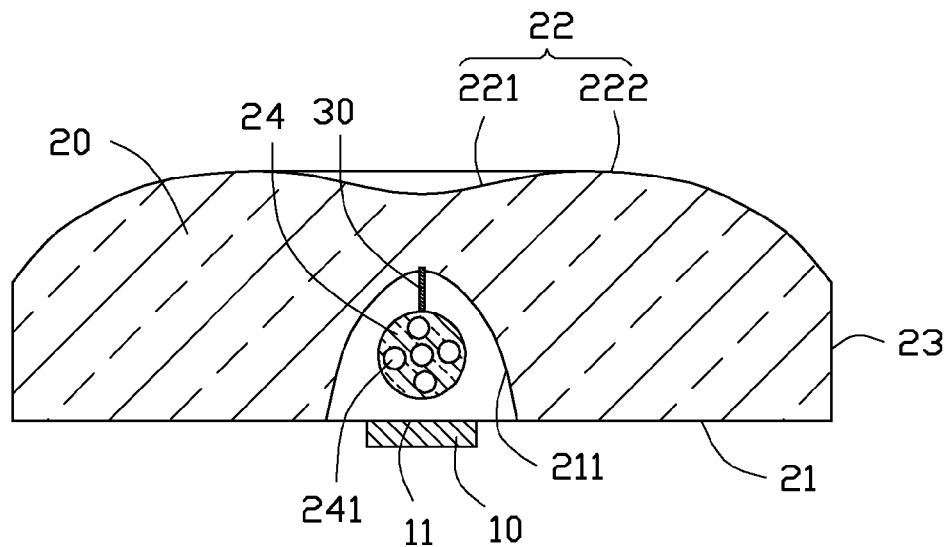
FIG. 3 is a cross-sectional view of the light source module of FIG. 1, taken along line III-III thereof.

Referring to FIGS. 1-3, a light source module 100 in accordance with an exemplary embodiment of the present disclosure is illustrated. The light source module 100 includes a light source 10 and a lens 20. Light emitted from the light source 10 is adjusted by the lens 20.

The lens 20 includes a bottom surface 21, a light input surface 211, a light output surface 22, a side surface 23 and a transparent ball 24 below the light input surface 211.

The bottom surface 21 is a planar circular surface. The light input surface 211 is a curved surface depressing from a center of the bottom surface 21 towards the light output surface 22 of the lens 20. The light input surface 211 defines a cavity. In the present embodiment, a central axis of the light input surface 211 is coaxial to that of the lens 20. The light input surface 211 is substantially elliptical, and a short axis of the elliptical light input surface 211 is substantially coplanar with the bottom surface 21, and a long axis of the elliptical light input surface 211 is perpendicular to the bottom surface 21.

The light output surface 22 is opposite to the bottom surface 21. The light output surface 22 is an aspherical surface and includes a concave surface 221 located at a center thereof and a convex surface 222 located at peripheral thereof and surrounding the concave surface 221. The concave surface 221 is just opposite to the light input surface 211 and is depressed towards the light input surface 211 of the lens 20. The concave surface 222 is used for diverging direct light (i.e., light having a small emerging angle) emitted from the light source 10. The convex surface 222 smoothly connects the concave surface 221 and is used for diverging side light (i.e., light having a large emerging angle) emitted from the light source 10.

The side surface 23 connects the bottom surface 21 and the light output surface 22. In the present embodiment, the side surface 23 is perpendicular to the bottom surface 21. The first side surface 23 is substantially cylindrical.

Figure 4:
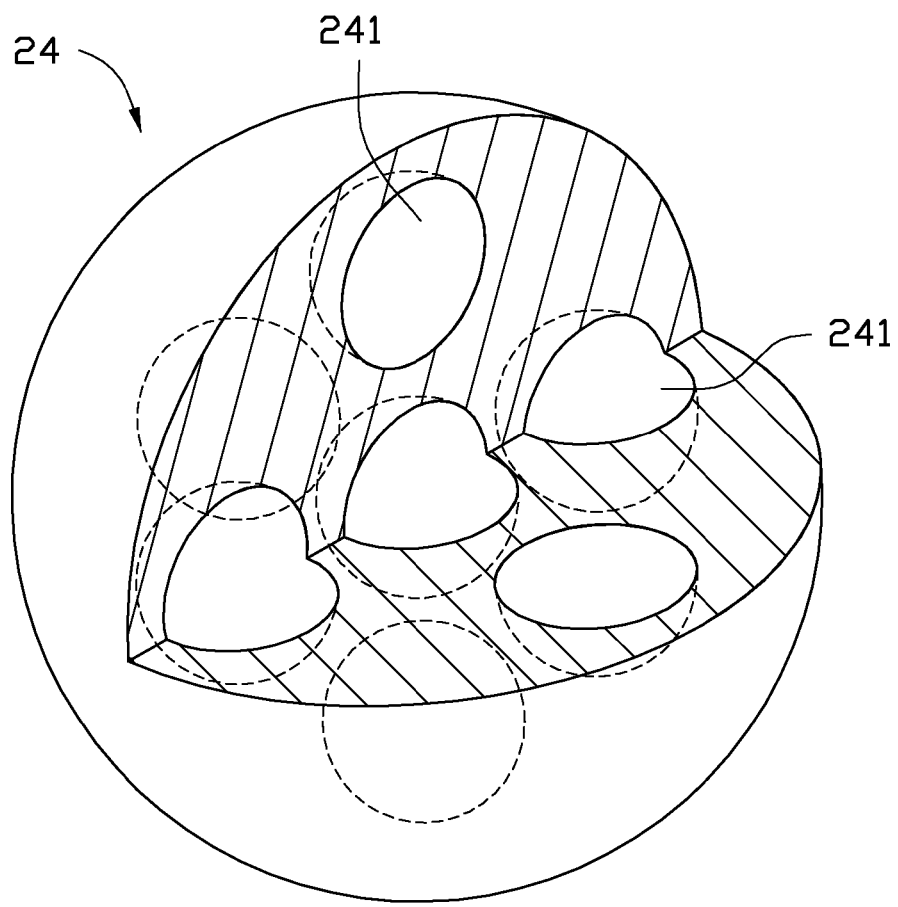
FIG. 4 is a partly cutaway view of a transparent ball of the light source module of FIG. 1, taken along line III-III thereof.

Referring to FIG. 4 also, the transparent ball 24 is received in the cavity defined by the light input surface 211. The transparent ball 24 faces the light source 10. The center of the transparent ball 24 is located at the optical axis of the lens 20. The transparent ball 24 defines a plurality of hollow holes 241 thereof. In the present embodiment, the transparent ball 24 defines seven hollow holes 241 thereof, and the hollow holes 241 are substantially spherical. The seven hollow holes 241 have the same size and are evenly distributed in the transparent ball 24. The radius of each the hollow hole 241 is substantially 0.4 millimeter. One of the hollow holes 241 is located at the center of the transparent ball 24, and the other six hollow holes 241 are surrounding the center hollow hole 241 with equal distance. The transparent ball 24 is made of polymethyl methacrylate (PMMA).

In the present embodiment, the light source module 100 further includes a supporting pole 30 fixed on the light input surface 211 of the lens 20 for supporting the transparent ball 24 on the lens 20.

The light source 10 faces the light input surface 211 of the lens 20 and is received in the cavity defined by the light input surface 211. In the present embodiment, a light emitting surface of the light source 11 is coplanar with the bottom surface 21 of the first lens 20. The light source 10 is an LED, and a central axis of the LED is coaxial to that of the lens 20.

Parts of the light beams emitted from the light source 10 reach the transparent ball 24, some are reflected and diverged by an outer face of the transparent ball 24 to different directions, and the others penetrate the transparent ball 24 and are diverged by the hollow holes 241 to different directions, and then enter the lens 20 via the light input surface 211. The other parts of light beams emitted from the light source 10 directly enter the lens 20 via the light input surface 211. All light beams are refracted and diverged by the concave surface 221 and the convex surface 222 of the lens 20 to radiate to the outside environment; therefore, the light emission of the light source module 100 can be substantially evenly distributed.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A light source module comprising a light source and a lens facing the light source, the lens comprising:
   a bottom surface;
   a light input surface being a curved surface depressing from a center of the bottom surface, the light source facing the light input surface;
   a light output surface opposite to the bottom surface, the light output surface comprising a concave surface located at a center thereof and a convex surface located at peripheral thereof and surrounding the concave surface; and a transparent ball received in a cavity defined by the light input surface, the transparent ball defining a plurality of hollow holes therein.

2. The light source module of claim 1, wherein a center of the transparent ball is located at an optical axis of the lens.

3. The light source module of claim 1, wherein the hollow holes have the same size and are evenly distributed in the transparent ball.

4. The light source module of claim 1, wherein the transparent ball defines seven hollow holes, one of the hollow holes is located at a center of the transparent ball, and the other six hollow holes are surrounding the center hollow hole with equal distance.

5. The light source module of claim 1, wherein the hollow holes is substantially spherical.

6. The light source module of claim 1, wherein the bottom surface of the lens is a planar circular surface.

7. The light source module of claim 1, further comprising a side surface connected to the bottom surface and the light output surface, the side surface being perpendicular to the bottom surface.

8. The light source module of claim 1, wherein the first light input surface is an elliptic sphere surface.

9. The light source module of claim 1, wherein a central axis of the light input surface is coaxial to that of the lens.

10. The light source module of claim 1, wherein the light source is an LED, and a central axis of the light source is coaxial to that of the lens.

\* \* \* \* \*